(12) United States Patent
Rowe

(10) Patent No.: US 7,717,788 B2
(45) Date of Patent: May 18, 2010

(54) PROGRESSIVE PROMOTIONAL MARKETING SYSTEM

(75) Inventor: Bruce C Rowe, Las Vegas, NV (US)

(73) Assignee: Harrah's Entertainment, Inc., Las Vegas, NV (US)

(*) Notice: Subject to any disclaimer, the term of this patent is extended or adjusted under 35 U.S.C. 154(b) by 102 days.

(21) Appl. No.: 10/641,512

(22) Filed: Aug. 14, 2003

(65) Prior Publication Data

US 2005/0037837 A1 Feb. 17, 2005

(51) Int. Cl.
- A63F 13/10 (2006.01)
- A63F 13/12 (2006.01)
- G06Q 30/00 (2006.01)
- G06Q 50/00 (2006.01)
- G07G 1/14 (2006.01)
- A63F 5/04 (2006.01)
- A63F 9/24 (2006.01)
- G07F 17/34 (2006.01)

(52) U.S. Cl. ........................ 463/25; 463/29; 463/42; 705/14; 705/14.12; 705/14.14

(58) Field of Classification Search ............ 463/12, 463/17, 18, 19, 20, 22, 25, 26, 27, 29, 40, 463/42, 28; 902/23; 273/138.1; 705/14, 705/14.1, 14.12, 14.14, 14.15, 14.25, 14.27, 705/14.28, 14.31, 14.32, 14.33, 14.35

See application file for complete search history.

(56) References Cited

U.S. PATENT DOCUMENTS

| | | | | |
|---|---|---|---|---|
| 4,624,459 A | * | 11/1986 | Kaufman | 463/20 |
| 5,116,055 A | | 5/1992 | Tracy | |
| 5,231,568 A | * | 7/1993 | Cohen et al. | 463/17 |
| 5,280,909 A | * | 1/1994 | Tracy | 463/27 |
| 5,282,620 A | | 2/1994 | Keesee | |
| 5,286,023 A | | 2/1994 | Wood | |
| 5,321,241 A | * | 6/1994 | Craine | 463/25 |
| 5,324,035 A | * | 6/1994 | Morris et al. | 463/42 |
| 5,344,144 A | * | 9/1994 | Canon | 463/27 |
| 5,362,064 A | | 11/1994 | Lofink et al. | |
| 5,370,399 A | * | 12/1994 | Liverance | 463/23 |
| 5,373,440 A | * | 12/1994 | Cohen et al. | 705/14 |
| 5,417,430 A | | 5/1995 | Breeding | |
| 5,429,361 A | * | 7/1995 | Raven et al. | 463/25 |
| 5,472,194 A | | 12/1995 | Breeding et al. | |
| 5,482,289 A | | 1/1996 | Weingardt | |
| 5,505,457 A | | 4/1996 | Boylan et al. | |
| 5,536,016 A | | 7/1996 | Thompson | |
| 5,564,700 A | * | 10/1996 | Celona | 463/27 |
| 5,573,248 A | | 11/1996 | Parra et al. | |
| 5,588,650 A | | 12/1996 | Emam et al. | |
| 5,605,334 A | | 2/1997 | McCrea, Jr. | |
| 5,611,730 A | | 3/1997 | Weiss | |

(Continued)

Primary Examiner—Peter DungBa Vo
Assistant Examiner—Matthew D. Hoel
(74) Attorney, Agent, or Firm—Fenwick & West LLP

(57) ABSTRACT

A system manages a progressive jackpot associated with designated gaming machines. The progressive jackpot is funded from a source of funds, and at a funding rate, independent of the paytables of the associated gaming machines. The system determines whether a player playing the associated gaming machine is eligible for the progressive jackpot using player eligibility rules, and further selects a winning player from among the eligible players (or from the associated gaming machines). The system uses funding rate rules to control the rate at which the progressive jackpot is incremented.

41 Claims, 3 Drawing Sheets

U.S. PATENT DOCUMENTS

| | | | |
|---|---|---|---|
| 5,647,592 A | 7/1997 | Gerow | |
| 5,655,961 A * | 8/1997 | Acres et al. | 463/27 |
| 5,709,604 A | 1/1998 | Coats | |
| 5,713,574 A | 2/1998 | Hughes | |
| 5,727,786 A | 3/1998 | Weingardt | |
| 5,735,525 A | 4/1998 | McCrea, Jr. | |
| 5,743,800 A | 4/1998 | Huard et al. | |
| 5,761,547 A * | 6/1998 | Hirano et al. | 396/55 |
| 5,809,482 A | 9/1998 | Strisower | |
| 5,820,459 A | 10/1998 | Acres et al. | |
| 5,833,538 A * | 11/1998 | Weiss | 463/21 |
| 5,836,817 A | 11/1998 | Acres et al. | |
| 5,868,619 A | 2/1999 | Wood et al. | |
| 5,876,284 A * | 3/1999 | Acres et al. | 463/25 |
| 5,885,158 A * | 3/1999 | Torango et al. | 463/27 |
| 5,911,626 A | 6/1999 | McCrea, Jr. | |
| 5,934,999 A | 8/1999 | Valdez | |
| 5,944,314 A | 8/1999 | Stavinsky | |
| 5,944,606 A | 8/1999 | Gerow | |
| 5,964,463 A * | 10/1999 | Moore, Jr. | 273/274 |
| 5,971,850 A * | 10/1999 | Liverance | 463/23 |
| 6,003,013 A * | 12/1999 | Boushy et al. | 705/10 |
| 6,015,347 A | 1/2000 | Maahs | |
| 6,032,955 A | 3/2000 | Luciano et al. | |
| 6,039,648 A * | 3/2000 | Guinn et al. | 463/16 |
| 6,059,658 A | 5/2000 | Mangano | |
| 6,059,659 A | 5/2000 | Busch et al. | |
| 6,099,407 A | 8/2000 | Parker, Jr. | |
| 6,110,043 A * | 8/2000 | Olsen | 463/27 |
| 6,113,495 A * | 9/2000 | Walker et al. | 463/42 |
| 6,120,376 A | 9/2000 | Cherry | |
| 6,126,167 A | 10/2000 | Kowalczyk | |
| 6,146,273 A * | 11/2000 | Olsen | 463/27 |
| 6,203,010 B1 | 3/2001 | Jorasch | |
| 6,210,275 B1 | 4/2001 | Olsen | |
| 6,213,876 B1 * | 4/2001 | Moore, Jr. | 463/22 |
| 6,217,448 B1 * | 4/2001 | Olsen | 463/25 |
| 6,231,445 B1 | 5/2001 | Acres | |
| 6,254,483 B1 * | 7/2001 | Acres | 463/26 |
| 6,267,671 B1 * | 7/2001 | Hogan | 463/25 |
| RE37,371 E | 9/2001 | Gerow | |
| 6,283,473 B1 | 9/2001 | Abramopoulos | |
| 6,299,532 B1 | 10/2001 | Smith | |
| 6,309,298 B1 | 10/2001 | Gerow | |
| 6,319,125 B1 * | 11/2001 | Acres | 463/25 |
| 6,331,143 B1 | 12/2001 | Yoseloff | |
| 6,336,862 B1 | 1/2002 | Byrne | |
| 6,364,768 B1 * | 4/2002 | Acres et al. | 463/25 |
| 6,425,823 B1 | 7/2002 | Byrne | |
| RE37,885 E | 10/2002 | Acres | |
| 6,464,584 B2 * | 10/2002 | Oliver | 463/25 |
| 6,474,649 B1 | 11/2002 | Kennedy et al. | |
| 6,478,676 B1 | 11/2002 | Dayan | |
| 6,511,377 B1 | 1/2003 | Weiss | |
| 6,527,175 B1 | 3/2003 | Dietz | |
| 6,565,434 B1 * | 5/2003 | Acres | 463/25 |
| 6,575,832 B1 * | 6/2003 | Manfredi et al. | 463/25 |
| 6,592,460 B2 * | 7/2003 | Torango | 463/27 |
| 6,620,046 B2 * | 9/2003 | Rowe | 463/25 |
| 6,676,522 B2 * | 1/2004 | Rowe et al. | 463/42 |
| 6,800,029 B2 * | 10/2004 | Rowe et al. | 463/25 |
| 6,843,723 B2 * | 1/2005 | Joshi | 463/25 |
| 6,892,182 B1 * | 5/2005 | Rowe et al. | 705/14 |
| 6,910,968 B2 * | 6/2005 | Nassef | 463/42 |
| 6,939,226 B1 * | 9/2005 | Joshi | 463/20 |
| 6,960,136 B2 * | 11/2005 | Joshi et al. | 463/25 |
| 6,974,385 B2 * | 12/2005 | Joshi et al. | 463/20 |
| 7,086,947 B2 * | 8/2006 | Walker et al. | 463/25 |
| 2001/0031664 A1 | 10/2001 | Acres | |
| 2002/0002075 A1 * | 1/2002 | Rowe | 463/25 |
| 2002/0029339 A1 * | 3/2002 | Rowe | 713/182 |
| 2002/0039923 A1 * | 4/2002 | Cannon et al. | 463/42 |
| 2002/0045473 A1 * | 4/2002 | Walker et al. | 463/20 |
| 2002/0072404 A1 | 6/2002 | Gerow | |
| 2002/0094859 A1 | 7/2002 | Hirsch et al. | |
| 2002/0103027 A1 * | 8/2002 | Rowe et al. | 463/39 |
| 2002/0107066 A1 | 8/2002 | Seelig et al. | |
| 2002/0113369 A1 | 8/2002 | Weingardt | |
| 2002/0132660 A1 | 9/2002 | Taylor | |
| 2002/0147043 A1 * | 10/2002 | Shulman et al. | 463/42 |
| 2002/0190469 A1 | 12/2002 | Conklin et al. | |
| 2003/0013513 A1 * | 1/2003 | Rowe | 463/20 |
| 2003/0013532 A1 * | 1/2003 | Rowe et al. | 463/42 |
| 2003/0027625 A1 * | 2/2003 | Rowe | 463/20 |
| 2003/0036426 A1 | 2/2003 | Ungaro | |
| 2003/0064798 A1 * | 4/2003 | Grauzer et al. | 463/29 |
| 2003/0069071 A1 * | 4/2003 | Britt et al. | 463/42 |
| 2003/0078101 A1 * | 4/2003 | Schneider et al. | 463/42 |
| 2003/0092484 A1 * | 5/2003 | Schneider et al. | 463/25 |
| 2003/0100360 A1 * | 5/2003 | Manfredi et al. | 463/25 |
| 2003/0148812 A1 * | 8/2003 | Paulsen et al. | 463/42 |
| 2004/0053681 A1 * | 3/2004 | Jordan et al. | 463/20 |
| 2004/0092315 A1 * | 5/2004 | Boyd et al. | 463/42 |
| 2004/0166940 A1 * | 8/2004 | Rothschild | 463/42 |
| 2004/0209674 A1 * | 10/2004 | Conover et al. | 463/25 |
| 2004/0229683 A1 * | 11/2004 | Mothwurf et al. | 463/26 |
| 2004/0254010 A1 * | 12/2004 | Fine | 463/25 |

* cited by examiner

PROGRESSIVE PROMOTIONAL MARKETING SYSTEM

BACKGROUND OF THE INVENTION

1. Field of the Invention

The present invention relates generally to progressive promotional systems for casino gaming machines, and more particularly to progressive promotional systems that are funded independently of the underlying gaming machines to which they are coupled, and operate and increment independently of the outcomes on such gaming machines.

2. Description of Background Art

Progressive jackpot systems are widely recognized as adding an exciting second chance to win feature for gaming machines. In a progressive jackpot system, a number of casino gaming machines are linked together over a network. The jackpot is "progressive" because each such linked game contributes a portion of the money bet by the player to the progressive jackpot. Thus over time, with many machines on a progressive system, the jackpot can grow to millions, even tens of millions of dollars. Generally, each individual linked game determines whether the player wins the progressive jackpot. Further, in order to win the progressive jackpot, the player at the linked machine must win the jackpot on the gaming machine itself, and must have bet the maximum amount that the gaming machine allows. it is incrementally funded with a small percentage of each player's bet (coin in) on each play. Progressive jackpot systems can be either local, such as operating only in a single casino, or wide area, such as operating across multiple casinos. Because wide area progressive systems include more gaming machines, they will tend to have larger jackpots and thereby draw more players, and thereby support larger jackpots similar to lotteries sweepstakes.

As mentioned, conventional progressive jackpot systems fund the jackpot amount from a small percentage of each player's bet. Another way of saying this is that the amount that increments the progressive jackpot is calculated into the pay table of the gaming machine. The pay table defines amount paid out for each type of win, represented to the player as a winning combination of symbols on a slot machine. For example, if the hold percentage on a progressive machine is 9%, some amount of this, say 6%, is the base hold rate used to fund the pay table, and the remaining 3% is the progressive hold rate that is directed to the progressive jackpot. Thus, for each dollar bet, 3 cents goes into the progressive jackpot. If 10 players are playing the gaming machines, and averaging ten, $1 bets per minute, then the progressive jackpot is being funded at a rate of $3 per minute. Again, this increment process is dependent on the portion of the hold that is directed into the progressive jackpot, as multiplied by the number of players, and the amount bet per minute.

This way of funding the progressive jackpot impacts the overall payout by the gaming machine. Between two otherwise identical machines with a base hold rate of 6%, the non-progressive machine returns on average 94% to the player, but the progressive machine with 3% going into the progressive pot returns only 91%. The retained 3% is directly taken from the casino's revenue, and the casino has no control over these funds. Further, in the case of a wide area progressive, the operator has no control in determining in which casino the jackpot will be awarded.

In order to obtain the progressive jackpot, a player must make the maximum bet only certain gaming machines. Accordingly, it would be desirable to provide a progressive jackpot system that did not fund the progressive jackpot directly from the paytable for the specific gaming machine, but funded it independently thereof. It would be further desirable to have a progressive jackpot available on any gaming machine as determined by the casino operator.

Because progressive jackpots can offer a life-changing outcome, they remain very attractive to many players, who continue to desire their availability. However, progressive systems are not entirely beneficial to the casinos that operate them. This is because the wide area progressive jackpot systems are not generally owned by the casino. Rather they are owned by the gaming machine manufacturers themselves, who profit directly from the players' contribution to the progressive jackpot. Nevertheless, the casino must still pay for at least some of the maintenance, service, and operation of the progressive machines. On the one hand, players demand that casino operators provide progressive jackpot machines. On the other hand, most of the profit from a progressive jackpot system goes to the game machine manufacturer not the casino. For this reason many casino operators feel forced to provide progressive systems, even though they do not significantly profit from them. Further, because of player demand, these machines are typically placed in the more valuable locations on the casino floor, further depriving the casino operator of maximizing its revenue using other types of games.

The casino operators' dilemma results from the particular technological design of conventional progressive systems. Because a game manufacturer owns the progressive system, it typically restricts which gaming machines can be linked to the progressive system. In addition, a game manufacturer can prevent a casino operator from using the game manufacturer's most popular games in other company's progressive systems. These restrictions prevent the casino operator from deciding for itself which game machines are to be coupled with a progressive system. To achieve this control, most game manufacturers use proprietary hardware and software to operate their progressive systems and their games. By using a proprietary approach, the game manufacturer can retain complete control over the progressive system, and can require use of its own gaming machines in its progressive system. This constrains the casino operator to use specific gaming machines from a particular manufacturer if it wants to have a particular progressive jackpot system. Accordingly, it would be desirable for a casino operator to be able to couple any gaming machines of its choosing to a progressive system, to reward play at such gaming machines.

SUMMARY OF THE INVENTION

An independent progressive promotional system provides a jackpot that incrementally grows over time, but is funded independently of the gaming machines to which it is linked, and therefore independent of the paytables of such gaming machines. The funds for the progressive jackpot can come from any independent source, such as existing cash or marketing funds held by the casino. The rate at which a progressive jackpot is incremented is controlled by one or more funding rates. The funding rates can vary in response to internal factors, or external factors. Internal factors include such aspects as the number of active players, types of players in terms of player tracking cards, types of games, denominations, total amount of the current progressive jackpot, rate of coin-in by active players, and any other aspect about the current state of the gaming machines, the jackpot, or the players. External factors include aspects such as time of day, day of week, season, casino events, and marketing or promotional programs.

To determine a winner (or winners) of a progressive jackpot, one or more eligibility rules are first used to select players who are eligible for the jackpot. The eligibility rules may, for example, select only players who having been playing for a minimum length of time, or at a certain minimum denomination, or have a certain level of player status in a player tracking program, or who are playing a particular gaming machine(s). A random selection mechanism is then used to select one or more winners from the eligible players. The random selection mechanism operates independently of the gaming machines that the eligible players are using, in that the players may win the progressive jackpot without necessarily obtaining a the jackpot combination on their gaming machines. The random selection mechanism may use random number generation, pull-tab type logic, or a combination of these approaches.

In a particular embodiment, a slot management system communicates with each gaming machine at the beginning and end of each gaming session. The slot management system communicates with a jackpot operation system that manages the operation of each progressive jackpot. The casino operator uses the jackpot operation system to designate a group of the gaming machines to be those participating in a progressive jackpot. The operator designates the size of the jackpot (e.g., $1,000,000), and the funding rate rules. The operator also defines the eligibility criteria for the players, such as the length of time needed to play, the amount of coin-in or minimum denominations, the level or tier of player tracking card status, or the like. The operator may define multiple jackpots for a given group of gaming machines, and may also define many different groups of gaming machines, each with its own progressive jackpot. Also, multiple progressive jackpots may be in operation simultaneously for a given set of gaming machines, and multiple sets of gaming machines may assigned to various different progressive jackpots. Progressive jackpots can be linked to gaming machines at multiple properties, and even across state, national, or tribal boundaries. This allows the casino operator to very specifically target different types of players, or make various groups or types of gaming machines more desirable to the players.

In one embodiment, during operation, each time a player begins play at the one of the gaming machines designated to participate in a progressive jackpot, the slot management system tracks the gaming by the player, including identifying the particular machine, the denomination of the machine, and other factors. The slot management system provides this information to the jackpot operation system. The jackpot operation system uses the received information to determine the appropriate funding rate (if dependent on internal factors, such as number of current players), and to determine which players are currently eligible. As determined by the particular random selection mechanism in use, the jackpot operation system will generate a random selection, and if appropriate identify a particular eligible player as a designated winner. Via the slot management system, the jackpot operation system can send a message to the gaming machine of the winning player informing the player of the win, and can further send a message to the other gaming machines in the designated group, or peripheral devices likes signs, that the progressive jackpot has been won.

In another embodiment, the slot management system communicates with card readers at each gaming machine to obtain information from a player tracking card. When a player starts a gaming session by inserting their player tracking card into the card reader, the slot management system obtains the player's account information from the card reader. The slot management system uses this information to access account data about the player, such as their player status or tier, current trip information, or like. The slot management system or the jackpot operation system may use this information as part of the eligibility determination by the eligibility rules. This feature further allows the casino to use the independent progressive jackpot system to target specific types or players.

DETAILED DESCRIPTION OF THE PREFERRED EMBODIMENTS

Figure 1:
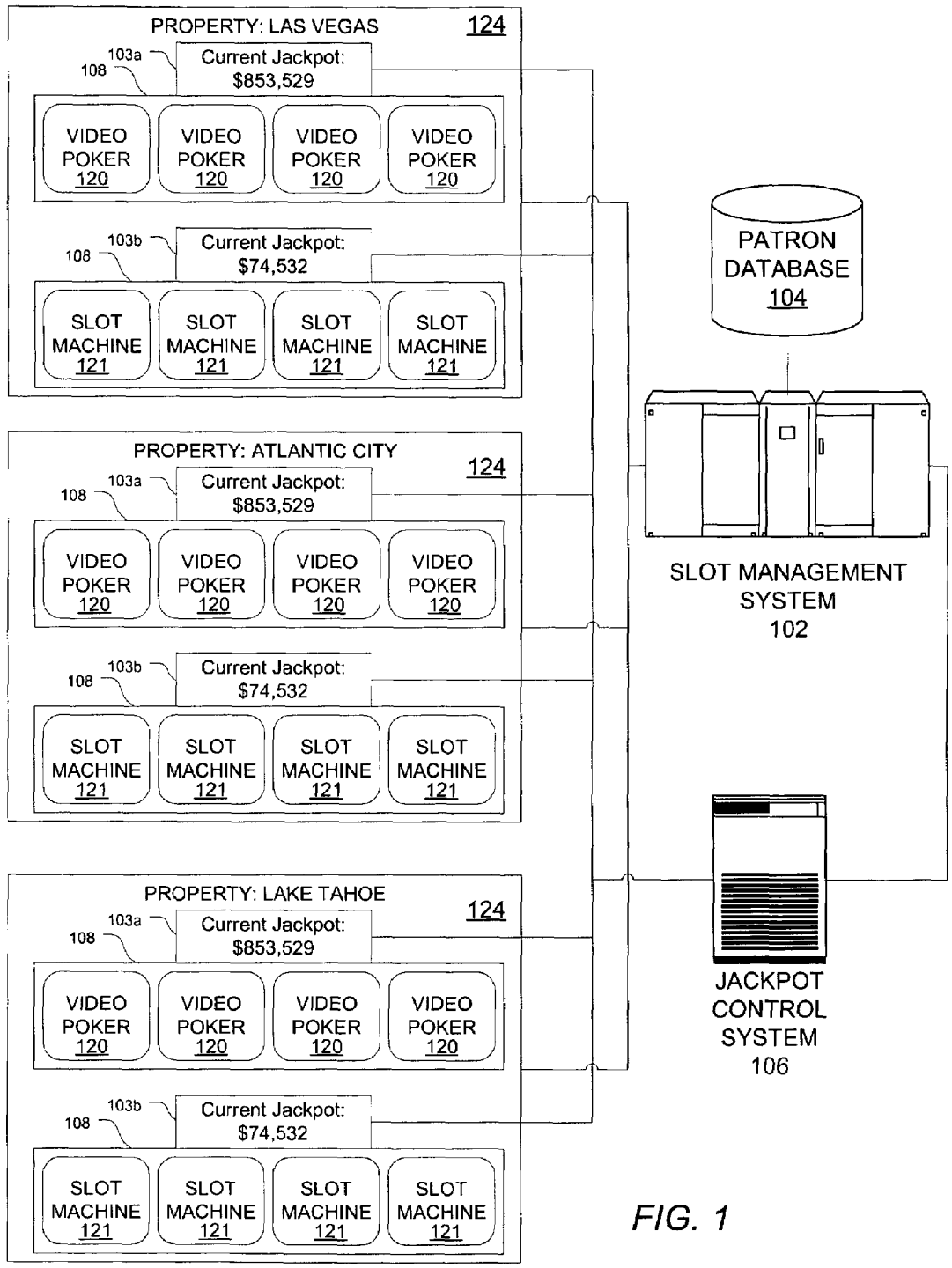
FIG. 1 is a diagram of multiple, simultaneous progressive jackpots at multiple properties conducted by an embodiment of the present invention.

FIG. 1 shows how multiple progressive jackpots can operate at multiple properties 124 according to one embodiment. In this example, there are three different casino properties 124 shown, Las Vegas, Atlantic City, and Lake Tahoe. At each property 124, there are two groups 108 of gaming machines, group A with video poker machines 120 and group B with slot machines 121. Four machines are shown in each group, but in actual practice any number of machines can be assigned to each group. Associated with each group is a progressive jackpot, the current amount of which is shown on a progressive jackpot meter 103a, b. The video poker machines 120 across the various properties are associated with a first progressive jackpot, for which the current amount is $853,529, as shown on the progressive jackpot meters 103a at each property, preferably in view of the group of video poker machines 120. The slot machines 121 across the various properties are likewise associated with a second progressive jackpot, for which the current amount is $74,532, again as shown on the progressive jackpot meters 103b at each property, preferably in view of the group of slot machines 121. Thus, players at the different properties can all participate in cross property jackpots, even across state or other jurisdictions.

Each of the two the progressive jackpots illustrated in FIG. 1 is targeted toward both a particular type of gaming machine, and is further targeted to a specific set of player attributes. In this embodiment, the casino operates a player tracking program by which players earn redeemable points or "comps" for their game machine and table play. An exemplary player tracking program will have multiple "tiers," for players of different levels of play, such a basic tier for players who play at a low level, a middle tier, and top tier for the players who wager the most amounts. Continuing with the example then, the first progressive jackpot associated with the video poker machines 120 is targeted at top tier players, and thus offers a very high jackpot amount. The second jackpot associated with the slot machine 121 is targeted at low tier players, and offers a corresponding lesser jackpot amount.

In one embodiment, the jackpot operation system 106 provides the functions of associating of particular progressive jackpots with particular groups of gaming machines, funding of such progressive jackpots, targeting of players through eligibility rules, and the determining which players win which jackpots. First, the jackpot operation system 106 is used to select which gaming machines 120, 121, individually or in groups 108, are associated with a particular progressive jackpot at a particular time. This feature gives the casino operator the ability to selectively associated any of its gaming machines on the casino floor with a particular jackpot, and thereby overcomes a limitation of existing systems in which only specific gaming machines can be coupled to a particular manufacturer's progressive jackpot system. As one example, the casino operator may select many different machines or groups of machines from various locations on the casino floor to participate in a particular progressive jackpot. As another example, the casino operator may desire to entice players to play a particular group of slot machines that are more profitable for the casino then otherwise typically used in a progressive jackpot system. By associating a high value progressive jackpot with this group of slot machines, the casino operator entices more players to use these machines. These various examples configurations are possible with the present invention, whether or not the particular gaming machines were not manufactured to be used in conjunction with this type of progressive jackpot.

Further, a particular progressive jackpot can be "moved" from a first group or type of gaming machine to a second group of gaming machines anytime during the operation of the progressive jackpot. Thus, as a particular jackpot becomes larger, the casino operator may change which gaming machines are associated with the jackpot through simple reprogramming of the jackpot operation system 106 and activation of another progressive meter 103 associated with the desired gaming machines. Additionally, because of the ability to arbitrarily associate a progressive jackpot with any gaming machine, the casino operator may even link an independent progressive jackpot to a set of gaming machines that are coupled to an existing conventional progressive jackpot system, thus providing two progressive jackpot opportunities to the player. These abilities have not been previously available because of the conventional proprietary physical connections used by gaming machine manufacturers between their gaming machines and their progressive jackpot systems.

As further illustrated in FIG. 1, a slot management system (SMS) 102 is coupled to each of the properties 124, and communicates with the various gaming machines to obtain data pertaining to events at each gaming machine. The SMS 102 is further coupled to a player database 104, which manages records about players in the casino's player tracking program. The SMS 102 communicates event information and player information to the jackpot operation system 106 to assist it in operating the various progressive jackpots.

Figure 2:
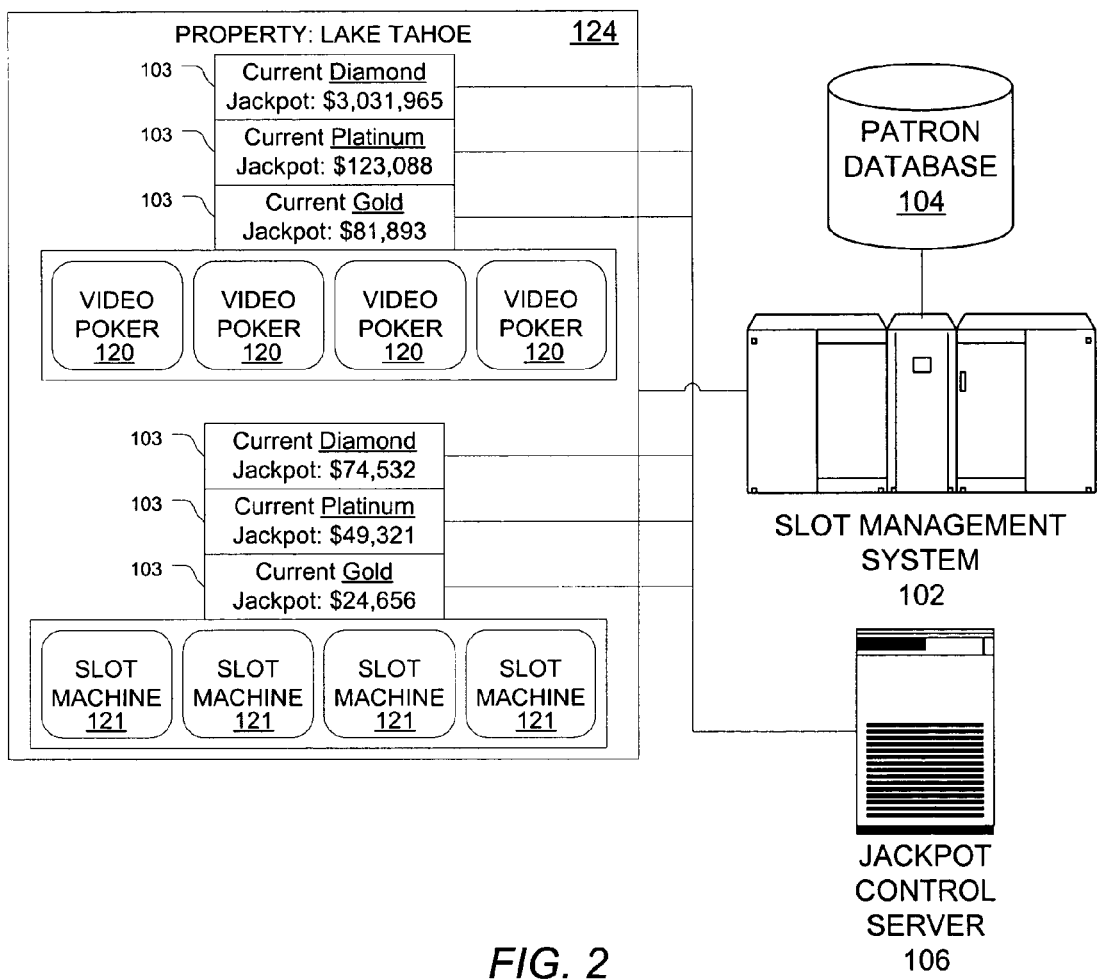
FIG. 2 is a diagram of multiple progressive jackpots concurrently associated with various gaming machines.

FIG. 2 illustrates another exemplary configuration of the present invention, in which multiple progressive jackpots are associated at the same time with various groups of gaming machines. In this example, the casino operates a player tracking card program as briefly described above, with three tiers, Diamond, Platinum, and Gold. A different progressive jackpot is established for each tier of players, and with each different type of gaming machine. Thus, for the video poker machines 120, there are three separate progressive jackpots, one for each tier of the player tracking program, as indicated by the respective progressive meters 103. Likewise, for the slot machines 121 there are three other, separate progressive jackpots, again with one for each tier of the player tracking program, and likewise as indicated on the respective progressive meters 103.

Referring generally to FIGS. 1 and 2, the jackpot operation system 106 operates in conjunction with the SMS 102 to determine which players are eligible for which progressive jackpots at any given time. For each progressive jackpot, a set of rules or criteria are defined which describe the eligibility requirements for players to qualify for the progressive jackpot. These criteria may include, for example, the player's tier in the player tracking program, the length of play by the player at the gaming machine, the amount of coin-in by the player during a current gaming session, the denomination of coin being played by the player, and so forth. For example, a particular progressive jackpot may require players to have a "Diamond" (or top) tier status in a player tracking program, and either play for at least 30 minutes on the gaming machine associated with the progressive jackpot, or have $200 of coin-in on such gaming machine during the current gaming session. In one embodiment, the SMS 102 tracks the details of each gaming session from the time the player inserts a player tracking card into a card reader coupled to the gaming machine (not shown), and applies the eligibility rules pertaining to each active progressive jackpot to determine which players are eligible. The SMS 102 provides updates to the jackpot operation system 106 as additional players become eligible for a particular progressive jackpot, and as players are no longer eligible, for example by ending their gaming session. The jackpot operation system 106 then maintains the information as to eligible players and provides the other functions for operating the progressive jackpots.

The jackpot operation system 106 further manages the funding rate for each progressive jackpot, and the display of the current jackpot amount on the progressive meters 103 on display in the casino. For each progressive jackpot, a set of one or more funding rates is defined. The funding rate can be defined as a function of various internal or external factors. Internal factors include the current amount of the jackpot, the number of current players at gaming machines associated with the progressive jackpot, the current rate of coin-in on such machines, and the like. External factors include factors that are independent of the particular players or gaming machines, such as time of day, day of week, season, promotional or other events in the casino. In this manner, multiple different funding rates can be combined. Thus, a particular progressive jackpot may have a base funding rate, say $1 a minute, that is increased by an incremental funding rate of $1 per minute to $2 a minute whenever at least 50 players are playing on the associated gaming machines, and then increased to $5 a minute on the jackpot reaches a first threshold, say $100,000, and then reduced by another funding rate, to $3 a minute when the jackpot reaches a second threshold, say $500,000. External factors can be applied to these conditions to increase or decrease the current funding rate. For example, external factors can be used to add $0.50 a minute between 6 pm and 1 am weekday, and to add $1.25 a minute from 6 pm to 2 am Fridays, Saturdays, and Sundays.

As can be seen from this example, any combination of factors may be defined to provide the funding rate(s) for a particular progressive jackpot system. This flexibility has not been previously offered in conventional progressive jackpot systems that were restricted to funding the progressive jackpot from the paytables of the particular gaming machines to which they were coupled. In the present invention, the source of funds is independent of the paytables of the gaming machines to which the progressive jackpots are linked. The funds may be provided from any other source, such as existing operating cash, budgeted marketing dollars, third party or sponsor funding, or the like.

The jackpot operation system 106 provides regular signals to the progressive meters 103 for the various progressive jackpots, updating the displays of such meters with the current jackpot amount. The effect of this is to incrementally advance the meters over time, allowing players to see the progressive jackpots grew, and thereby further entice the players to continue playing.

The jackpot operation system 106 further manages the determination of which players, if any, win the various progressive jackpots. This determination may be made directly by determining a winner player, or indirectly by first determining a winning gaming machine and then determining the player playing at that gaming machine. The jackpot operation system 106 uses any type of random selection mechanism to determine a winning player from among currently eligible players, or a winning gaming machine from among those gaming machines associated with the progressive jackpot and in use at the time. Significantly, a player does not necessarily have to win a payout listed in the paytable (e.g., a "jackpot" or other payline) on the gaming machine he is playing in order to win the progressive jackpot associated with that gaming machine. This in effect gives players a "second chance to win" while they are playing the gaming machines associated with a progressive jackpot, where the second chance to win is entirely independent of any payout from the paytable. For example, even if a player draws a losing hand on video poker gaming machine 120, or pulls a sequence of losing symbols on a slot machine 121, that player may still win the progressive jackpot linked to the gaming machine by being selected by the jackpot operation system 106 of the present invention.

More specifically in one embodiment, for each progressive jackpot, the jackpot operation system 106 periodically selects or generates a value, which is then associated with either a player currently eligible for the progressive jackpot, or one of the gaming machines associated with the jackpot and in use by an eligible player. The value is tested, read, or otherwise evaluated to determine whether it is a winning value. If so, jackpot operation system 106 sends a signal to the player and/or gaming machine associated with the winning value, notifying them that they have won the progressive jackpot. At about the same time, the jackpot operation system 106 suspends the funding of the progressive jackpot, and sends a signal to the progressive meter 103 for this jackpot to stop further incrementing the display. The jackpot operation system 106 also notifies the casino operator that a progressive jackpot is won, so that the operator may take the appropriate steps to payout the winnings to the player.

As noted, FIG. 1 illustrates a system in which there is a single jackpot control system 106 managing multiple progressive jackpots at multiple properties. In an alternate embodiment, a central jackpot control system 106 operates in concert with local servers at each property to manage the progressive jackpots. In this embodiment, the various functions of the jackpot control system 106 can be distributed amongst the servers as desired by the system administrator. Alternatively, the system may operate just with a number of distributed jackpot control systems 106 at the multiple properties, without a central system. In any of these embodiments, the various progressive jackpots can be associated with gaming machines at any of the properties.

Figure 3:
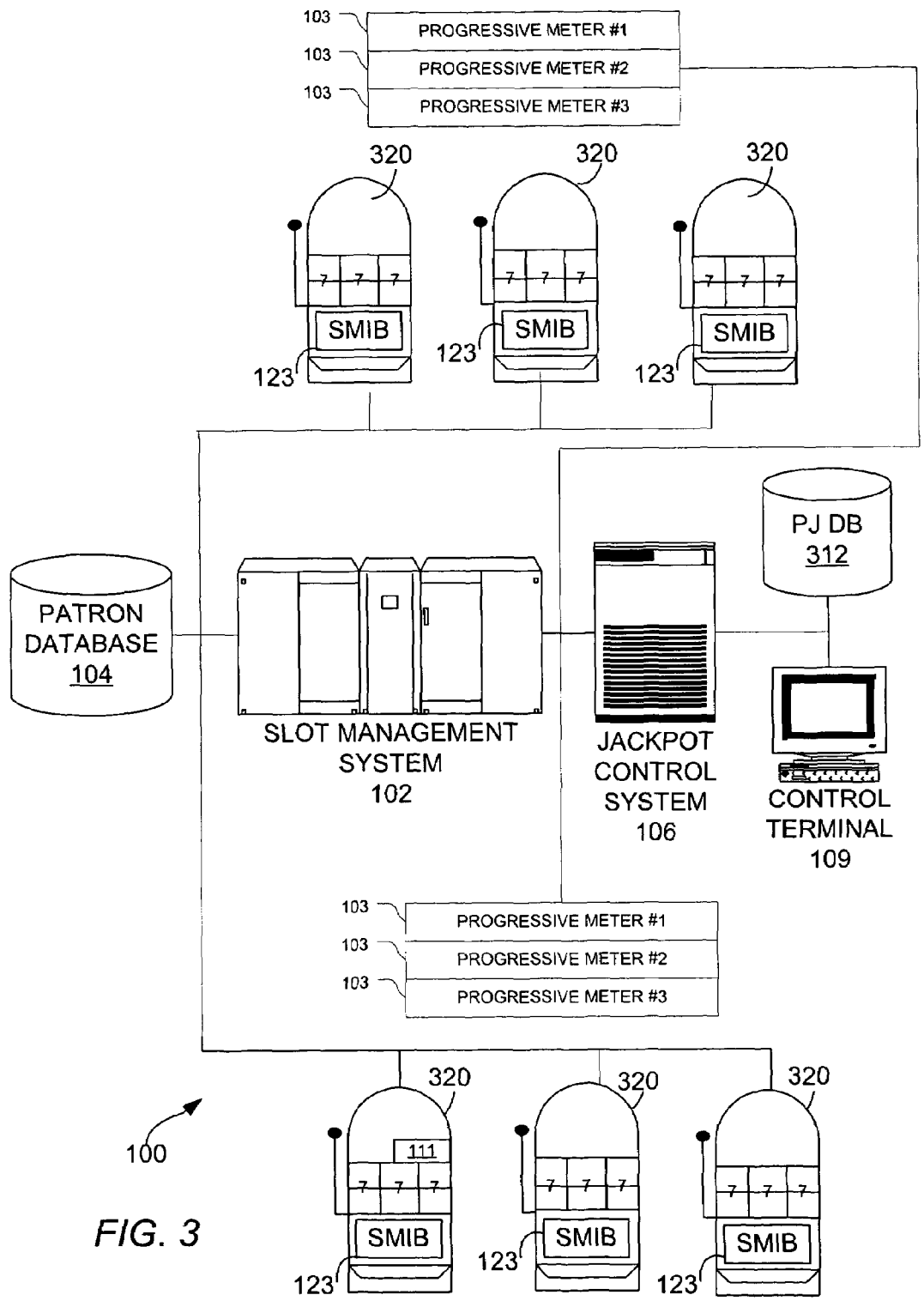
FIG. 3 is a system diagram of an embodiment a jackpot operation system and its operative environment.

Turning now to FIG. 3, there is shown in further detail aspects of a system in an embodiment of the present invention. In this embodiment, the jackpot operation system 106 is coupled over a network (e.g. an Ethernet network) to the SMS 102, and to a control terminal 109. The jackpot operation system 106 is further coupled over a network to a set of one or more progressive meters 103. A casino operator uses the control terminal 109 to configure and manage the jackpot operation system 106. The SMS 102 is coupled over a network to the gaming machines 320 in the casino (only six are shown here for simplicity) and to the jackpot operation system 106. The SMS 102 is further coupled to the player database 104.

The gaming machines 320 include generally any kind of gaming machine of interest, such as slot machines, video poker machines, keno machines, and so forth. Each gaming machine 120 may include a card reader (not shown) for reading a player identification card, such as may be issued by the casino as part of a player tracking program or by an operator of the casino containing the gaming machines. The use of card readers with gaming machines is well known in the art, and thoroughly described, for example, in U.S. Pat. No. 5,429,361, which is incorporated by reference herein. A system for monitoring player betting in a multiple property system, using player identification cards is described in U.S. Pat. No. 5,761,647, which is also incorporated by reference herein.

The gaming machines 320 typically include a main processing unit (MPU) (not shown) and a communication device 123. In one embodiment, the communication device is a slot machine interface board (SMIB), also known as a slot interface board. The MPU is responsible for the gaming machine's operation, and contains the logic and mathematical formulas that allow the game to function. The MPU communicates game events to the SMIB 123, which in turn relays information up to the SMS 102 where it is stored, tracked, and reported on. The SMIBs may be connected to the SMS 102 via a wiring network of twisted pair cabling, and operating using a conventional network operating system. The communicated events also include card-related events occurring at the card reader, such as a card-in event or a card-out event. Typically, the MPU is proprietary to each gaming machine manufacturer, while the SMIB and SMS 102 are proprietary to the SMS 102 developer. Suitable SMS's include the SLOT DATA SYSTEM provided by Bally Gaming & Systems of Las Vegas, Nev., or the GSI ON-LINE SLOT SYSTEM provided by Gaming Systems International, also of Las Vegas. The details of coupling the gaming machines 320 to the SMS 102 are known to those of skill in the art, and provided by the developers of the selected SMS. U.S. Pat. No. 5,429,361, incorporated above, also describes the details of one SMS.

Given the various types of gaming machines, there are numerous different possible gaming machine events. When an event occurs, the MPU notifies the SMIB that an event has taken place. The SMIB in turn sends the SMS 102 a message containing the appropriate information descriptive of the event. The content of message will depend on the particular SMS in use, but generally event messages include fields such as:

Message type
Transaction code
Player identification card number (from player identification card, if available)
Gaming machine ID
Gaming machine stand (location or group) ID
Property ID
Game denomination
Theoretical hold %
Date
Time
Coins bet
Coins won
Number of games played
Jackpot amount
Bonus points
Message ID
Type code; and
Game type.

These fields may be substantially the same type of data components that any SMS may send, though the particular fields in message may be customized as desired by the SMS provider or casino operator. For example, some SMS's use a Side ID to identify a redundant server that is currently active for receiving messages; also some SMS's use sequential message IDs in order to track messages and identify missing messages. Particular message may be defined for communication to the jackpot operation system 106 to indicate an eligible player, for example, or other status information pertinent to the progressive jackpot.

In this embodiment, the gaming machines 320 communicate gaming events occurring at the machines 320 to the SMS 102 for further processing. The SMS 102 comprises a computer system that monitors and tracks bets made by patrons at gaming machines 320. In a preferred embodiment, bet tracking is accomplished through a card reader (not shown) associated with a gaming machine 320. A player inserts his tracking card in the card reader to initiate bet tracking and removes it to terminate bet tracking. A patron's betting activity at a gaming machine 320 accumulates in the SMS 102 until the gaming session is terminated. Bet tracking data accumulated by the SMS 102 includes the identification of the games played, the amount won or lost, and the time period that the patron played the game. U.S. Pat. No. 5,429,361, the contents of which are fully incorporated by reference herein, describes one system for tracking the betting activity of casino patrons at gaming machines.

The gaming machines 320 and the system design is not limited to using gaming machines 320 which have their own MPU for operating game functionality. The gaming machines 320 may also include those that operate in a system-centric architecture, where each machine 320 operates as a terminal, and a central computer operates the primary game functionality, including generating the appropriate random outcomes for the game. For example, the gaming machine 320 may include networked bingo, keno, or similar games. In these types of games, the central computer reports appropriate events to the SMS 102, while the gaming machines 320 can report other types of local events to the SMS 102.

Also coupled to the SMS 102 is the player database 104. As mentioned above, the player database 104 stores records for each player who has a player tracking card issued by the casino. The player record contains demographic information about the player, historical transaction information about the player, such as a history of their visits to the casino, along with information about their status in the player tracking program, such as their tier level, accumulated points or comps, and measures or scores of their worth to the casino. Upon a card-in event by a player's tracking card at a gaming machine 320, the SMS 102 initiates a tracking session for the player, and monitors the player's betting, including coin-in, wins, losses, the hold percentage of the gaming machine, and any other session or game related information desired by the casino operator to assist in operation of the jackpot operation system 106. Periodically, or upon request, the SMS 102 provides information about players to the jackpot operation system 106, for example, for the jackpot operation system 106 to determine if a player is eligible for a progressive jackpot, or alternatively, to inform the jackpot operation system 106 that a particular player is eligible. Each gaming machine 320 further includes a display panel (not shown) that the SMS 102 can address to display messages to the player, such as displaying the customer name, current tier status, points, status of the progressive jackpot, or other status information.

An exemplary progressive jackpot has a set of attributes and rules that govern its operation by the jackpot operation system 106. The rules of a progressive jackpot specify under which conditions players are eligible for the jackpot, and the rate(s) at which the jackpot is funded.

Using the operator terminal 109, the casino operator accesses the jackpot operation system 106 to set up new progressive jackpots. An operator defines a progressive jackpot and configures its attributes. In one embodiment, the progressive jackpots include the following basic attributes:
   Progressive jackpot start date
   Initial jackpot amount
   Gaming machines linked to the progressive jackpot
   Properties linked to progressive jackpot As illustrated in FIGS. 1 and 2, progressive jackpots can be either property-specific or apply to multiple properties, including a subset of the casino's locations or to all of the casino's locations (i.e., an enterprise-wide progressive jackpot). In particular, the casino operator is able to selectively choose which gaming machines are linked to a progressive jackpot, and is further able to change this association over time, during the course of the progressive jackpot itself. For example, the casino operator may define a particular progressive jackpot to operate on a first group of gaming machines during a first time period for the hours of 6 am to 5 pm, and on a second set of gaming machines for a second time period from 5 pm to 6 am. This allows the casino operator to adapt the progressive jackpot to the traffic patterns on the casino floor, or to use the progressive jackpot to influence such traffic patterns. For example, associating a high value progressive jackpot with a particular group of gaming machines tends to direct more players to such machines.

After the progressive jackpot's basic attributes are defined, the operator defines a set of rules that apply to the progressive jackpot. In an embodiment, a progressive jackpot's rules are structured in the form: "If[condition] Then [action]." The "If" section of the rule contains one or more conditions that are associated with the desired action specified in the Then clause. The conditions map may to function calls that retrieve and evaluate the condition described from data available to the jackpot operation system 106 from various computer systems in the casino. The conditions may use any combination of Boolean logic or arithmetic evaluations (e.g., AND, OR, NOT, >, <, =, etc.), or even fuzzy logic. The "Then" section of the rule specifies the action to be taken with respect to the particular progressive jackpot.

In one embodiment, the jackpot operation system 106 uses a rules editor and rules processing engine for defining and processing the rules associated with each progressive jackpot. A rules editor (operated from the control terminal for example) and processing engine is a software package that is used to create and process the rules of a progressive jackpot. Once defined, a progressive jackpot's attributes and rules are stored in the progressive jackpot database 312. Further, rules engines are particularly beneficial where there are a large number of rules and where the rules may change frequently. In either case, the rules engine beneficially enables a user— such as a progressive jackpots operator—to encode new rules using a language that a business user can easily comprehend. By reducing the reliance on technology personnel, associated costs and turnaround times are reduced.

In the context of the progressive jackpots system, two primary types of rules are used, player eligibility rules and funding rate rules. The player eligibility rules define the condition under which a player becomes eligible to win a progressive jackpot associated with the gaming machine that the player is playing. The funding rate rules define the rate at which a progressive jackpot is incremented. The following lists some examples of conditions (or variables) that the player eligibility rules can use to evaluate whether a player is eligible.
   Player tracking tier
   Minutes played in gaming session
   Amount of won/loss during session Amount of coin-in Player's hold percentage in gaming session An example of an player eligibility rule is: "If([amount of coin in >$100] AND [Player tracking tier=Diamond]) then [set player as eligible]."

In one embodiment, the jackpot operation system 106 receives messages from the SMS 102 each time a player's state changes, such the total amount of coin-in by a player, a new player card-in, a player card-out, and the like. The message will indicate that relevant state change or status, along with identification of the player, and identification information (e.g., game ID, property ID, stand ID) identifying the gaming machine 120 at which the player is located. Using the gaming machine identification information, the jackpot operation system 106 determines which progressive jackpot is associated with this gaming machine, and then evaluates the event with respect to the player eligibility rules. If the player becomes eligible for the progressive jackpot, information identifying the player (e.g., a player ID, account number, player tracking number other index) is added to a current list of eligible players. Alternatively, the jackpot operation system 106 adds the ID of the gaming machine to a list of eligible gaming machines.

One scenario is as follows. A player starts a gaming session at a gaming machine 120 by inserting a player tracking card into the gaming machine's card reader. The player's account ID is read by the card reader and provided to the SMS 102. The SMS 102 queries the player database 104 and obtains data from the player's account record, such as the player's tier, accumulated points, and the like. The SMS 102 then initiates a gaming session record for the player, including for example, the starting time of the session, the gaming machine ID, stand ID, and property ID. The SMS 102 sends a message to the jackpot operation system 106 indicating the player's account ID, tier, and gaming machine ID, and the related data. The jackpot operation system 106 determines whether there is a progressive jackpot for the identified gaming machine, and if so, evaluates the rest of the data with respect to the player eligibility rules. If the player is immediately eligible (e.g., the progressive jackpot only requires a particular player tier, but no minimum length of play or coin-in, or simply requires play on a particular gaming machine), the jackpot operation system 106 instructs the SMS 102 to display a message to the player on the local display informing the player that he is eligible for the progressive jackpot. If the player is not immediately eligible, then the SMS may display nothing, or alternatively may display a message indicating the amount of time or coin-in remaining until the player is eligible, if such factors are part of the eligibility conditions. As the player continues the player, the SMS sends further messages to the jackpot operation system 106, for example with the player's current coin-in or playing time. The jackpot operation system 106 evaluates these messages as before.

In the scenario just described, the jackpot operation system 106 receives event and status information from the SMS 102 and evaluates the information with the eligibility rules to determine whether a player is eligible for a progressive jackpot. In an alternative embodiment, the SMS manages the evaluation of the player eligibility rules, and informs the jackpot operation system 106 whenever a player becomes eligible or ineligible.

In situations where gaming machines 320 that do not have card readers are linked to an independent progressive jackpot, then eligibility rules would reflect this fact, and may simply make any such linked machine eligible, or may limit eligibility to those machines which have a minimum rate (or amount) of coin-in over a selected time period (e.g. hourly). This approach encourages even those players without player tracking cards to provide a minimum level of game play in order to qualify for the independent progressive jackpot.

The funding rate rules define how the jackpot operation system 106 will increment the progressive jackpot, and thereby the amount shown on the progressive meter(s) 103. The funding rate(s) for a progressive jackpot may be fixed or variable, and where variable may be based on either internal or external factors. The funding rates may be expressed as absolute (e.g., $4 per minute) or relative (e.g., +$1 per minute) values. The jackpot operation system 106 communications with both the SMS 102 and other systems (e.g., a casino event management system that manages promotional or other special events at the casino; a lodging management system that manages hotel occupancy and reservation information) to obtain information about the internal and external factors for evaluating the funding rate rules. Internal factors include such variables as:

Current amount of progressive jackpot

Current funding rate

Current number of card-in players

Rate of card-in by players

Current number of players at tier X (X is one or more of the player tracking tiers)

Rate of card-in by players at tier X

Current number of all players

Total amount of coin-in for all open gaming sessions

Rate of coin-in

Hold percentage of gaming machines

These variables are preferably associated with, as appropriate, the gaming machines linked the progressive jackpot of interest, but may also include other gaming machines. External factors that may be used as funding rate conditions are those independent of the particular players, jackpot, or gaming machines. These factor include, for example:

Time of day

Day of week

Seasonality

Occupancy of hotel rooms

Special event status (e.g., holiday, promotional event)

As can be readily appreciated, the use of funding rate rules provides tremendous flexibility to the casino operator to structure the progressive jackpot. As described above, the funding rate of a progressive jackpot can change over time, and in response to any of the desired internal or external factors.

As noted above, the casino operator may define a progressive jackpot that operates across multiple properties. In such a circumstance, it may be desired that each property have its own set of player eligibility rules for the progressive jackpot. For example, at a first property, eligibility for the progressive jackpot may be based on a minimum amount of coin-in of $100, whereas at the second property, the minimum coin-in is $200. Similarly, there may be other differences in terms of player tier, minimum playing time, or any other eligibility factor. Similarly, the finding rate rules can accommodate differences between the properties, such as using weights or other factors to evaluate the significance of a condition relative to one property or another. For example, a funding rate rule may be defined such as:

If[(0.50×current number of card-in players at Property #1)+(the current number of card-in players at Property #2)>500] Then [funding rate=$N dollars/minute].

In general, any combination of internal or external factors across any number properties may be used to define funding rates for progressive jackpot.

In addition to a rules engine, many other embodiments are possible for creating the rules for a new progressive jackpot. For example, for greater flexibility, the rules generator could be configured to accept straight text according to a predefined programming language. Before adding the rule to the progressive jackpot, the rules generator would check it for syntax errors. This would give a high level of flexibility to operators for creating progressive jackpots.

In one embodiment, progressive jackpot "templates" are used where more control by the casino is desired—for example where an enterprise-level operator wants to limit the ability of local property-level operators to customize local progressive jackpots. In such cases, the enterprise-level operator provides the local operators with progressive jackpot templates, where a template has a selected set of the rules and attributes of the progressive jackpot pre-defined. The templates provide predefined attributes, such as the funding rate, and only allow customization of certain other rule parameters or attributes, such as starting dates and times, gaming machine associations, eligibility criteria and the like. The local operators use the operator terminal 109 to create progressive jackpots using the limited base rule set allowed by the templates. In this manner, the enterprise operator can allow the local property to tailor a progressive jackpot to its particular players by local customization of eligibility rules, but constrain the local operator in terms of the size or rate at which the progressive jackpot is funded in order to control is budget and exposure.

The final aspect of the jackpot operation system 106 is the determination or selection of winners of a progressive jackpot. Generally, the jackpot operation system 106 includes a random selection mechanism, which may be a software module, or configurable circuit. For each progressive jackpot that the jackpot operation system 106 manages, it periodically generates a value (e.g., a random number or an index into stored randomly assigned table) using the random selection mechanism. The value is then evaluated to determine whether it is a winning value. If so, the player or gaming machine associated with the value is deemed a winner. There a variety of ways in which the random selection mechanism can be implemented.

In a first embodiment, the random selection mechanism uses "pull-tab" type logic to select a value for evaluation. A pull-tab table is stored in memory, which may be in random access memory of the jackpot operation system 106, or in a flash, optical, or magnetic memory media readably coupled to the jackpot operation system 106. The pull-tab table contains a preconfigured distribution of values that reflect the desired probability distribution for winning the progressive jackpot. For example, if it is desired to have a progressive jackpot with odds of 1:10,000,000 (1 in 10 million) of winning, then the pull-tab table contains 10,000,000 entries, one of which is randomly selected to store a code value indicating a winner (e.g., "1") and the rest of which contain a code value indicating a losing entry ("0"). The random selection mechanism then indexes through the pull-tab table as appropriate and evaluates the value stored at the current location to determine if is the winning entry. Of course, the pull-tab table may have multiple winning entries, instead of just one, if desired. The benefit of a pull-tab table is that guarantees the correct probability distribution for the progressive jackpot, while not subjecting the casino operator to the potential risk of random number generator which may, due to its random nature, pick multiple winners in a very short time frame.

The association of a gaming machine or eligible player with the current pull-tab value (which may or may not be a winning value) can be variously configured. In one embodiment, the jackpot operation system 106 maintains a table of eligible players, and updates the table to add players as they qualify, and to remove players who either card-out (terminate their gaming session) or otherwise become ineligible for the progressive jackpot. The random selection mechanism then maintains an index into this table, and associates the current pull-tab entry with the current index into the eligibility table. The random selection mechanism can either increment the index in the eligibility table to the next entry, or randomly move the index. In a different variation, the eligibility table lists the gaming machines that are being used by currently eligible players.

The timing for selection of a value from the pull-tab table may also be variously configured. In one embodiment, the random selection mechanism operates on periodic basis, selecting a pull-tab entry and player in a regular periodic manner, for example, once per minute. In a different embodiment, the selection is event driven, for example, each time a player or machine is added to the eligibility table.

As a yet a further refinement, one or more jackpot determination rules may be defined. A jackpot determination rule defines the parameters for selection of a value from the pull-tab table, and the conditions under which such parameters operate. In this embodiment, the rate at which entries in the pull-tab table are evaluated is varied as a function of any of the previously described internal or external factors used to control the funding rate for the progressive jackpot, or any other factors deemed useful by the casino operator. For example, a jackpot determination rule may define the selection rate to be one entry per minute in the pull-tab table as a base rate, and increase that to 4 entries per minute when there are more than 500 eligible players.

In an alternative embodiment, the random selection mechanism uses a random number generator to generate the value for evaluation as a winning entry; for example a value between 1 and 10,000,000. The generated value is compared with a threshold value set to desired level of probability for a winning entry. If the generated value is equal to or less than the threshold value, the entry is a winning value. Any of the previously described methods may be used to associate the generated value with an eligible player or gaming machine.

When a winning entry is generated, the jackpot operation system 106 sends a message to the SMS 102 indicating that a winner has been selected, and providing at least one of the player ID or the gaming machine ID of the winning player. The SMS uses this information to send a message to the display panel on the winning player's gaming machine 320 informing the player that they have won the progressive jackpot. In addition, the jackpot operation system 106 suspends the funding of the progressive jackpot, and sending a signal to the progressive meter 103 displaying the current amount of the progressive jackpot to stop incrementing, and to flash or otherwise indicate the winning amount, which will be clearly visible to the winning player and many others in the casino.

Preferred embodiments of the invention have been discussed as specifically applied to progressive jackpots in the context of a casino. These progressive jackpots methods and systems are advantageously applied to progressive jackpots for casinos and other gaming enterprises; however, the invention can be applied broadly to many other enterprises to encourage patronage of the enterprise's goods or services. For example, the present invention can be used to facilitate progressive jackpots in the fields of credit cards, airline frequent flyer miles, entertainment, dining services, shopping, and on-line activity.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. In particular, many variations and specific design choices can be made to the specific embodiments of the independent progressive jackpots system described herein without departing from the inventive concepts. It is therefore intended that the scope of the invention be limited not by this detailed description, but rather by the claims appended hereto.

I claim:

1. A method of conducting a progressive jackpot, the method performed by a computer system, and comprising:
   storing in a computer system database historical data of player betting activity for a plurality of players;
   designating, with the computer system, a plurality of gaming machines as associated with a progressive jackpot, the progressive jackpot operating during a time period;
   funding the progressive jackpot using a funding rate from an existing source of funds, where the source of funds is independent of paytables of the gaming machines and is not directly taken from coin-in to the gaming machines during the time period the progressive jackpot operates;
   automatically and programmatically varying, by the computer system, the funding rate during the time period the progressive jackpot operates using funding rate rules based upon internal factors describing operating conditions of the gaming machines and external factors describing factors independent of the gaming machines and players;
   determining, by the computer system using the historical data of player betting, that one or more players at the gaming machines are eligible to win the progressive jackpot associated with the gaming machines;
   determining on a periodic basis whether at least one of the eligible players is a winner of the progressive jackpot, wherein the periodic basis is variable in response to the internal factors describing operating conditions of the gaming machines and external factors describing factors independent of the gaming machines and players, wherein the periodic basis varies in response to an amount of the progressive jackpot; and
   wherein the internal factors comprise at least a plurality of the following:
      a current amount of the progressive jackpot;
      a current funding rate;
      a current number of card-in players;
      a rate of card-in by players;
      a current number of players at a selected player tier;
      a rate of card-in by players at a selected player tier;
      a current number of all players;
      a total amount of coin-in for all open gaming sessions; and
      a hold percentage of the gaming machines.

2. The method of claim 1, wherein designating a plurality of gaming machines as associated with a progressive jackpot comprises:
   designating a first group of gaming machines at a first casino property in a first jurisdiction and designating a second group of gaming machines at a second casino property in a second jurisdiction.

3. The method of claim 1, wherein designating a plurality of gaming machines as associated with a progressive jackpot comprises:
   designating a group of gaming machines that are already coupled with an existing progressive jackpot funded from the paytables of the gaming machines and independent of coin-in to the gaming machines.

4. The method of claim 1, wherein designating a plurality of gaming machines comprises:
   associating the progressive jackpot with a first group of gaming machines during a first portion of the time period, and associating the progressive jackpot with a second group of gaming machines during a second portion of the time period.

5. The method of claim 1, further comprising:
   associating a group of gaming machines with a plurality of progressive jackpots, each progressive jackpot limited to a specific type of player in a player tracking program.

6. The method of claim 1, wherein the designation of gaming machines associated with the progressive jackpot is based on traffic patterns in the casino.

7. The method of claim 1, further comprising:
   defining attributes of the progressive jackpot including a start date and an initial jackpot amount.

8. The method of claim 1, wherein the funding rate is a combination of funding rates, including a base rate and at least one funding rate that varies the base funding rate in response to the current time.

9. The method of claim 1, wherein designating individual players at the gaming machines are eligible comprises determining a player's tier in a player tracking club.

10. The method of claim 1, wherein designating individual players at the gaming machines are eligible comprises determining a rate of coin-in by the player at the gaming machine.

11. The method of claim 1, further comprising:
    displaying a message on the gaming machine used by a player indicting that the player is eligible for the progressive jackpot.

12. The method of claim 1, further comprising:
    displaying a message on the gaming machine used by a player indicating a further condition to be satisfied for the player to be eligible for the progressive jackpot.

13. The method of claim 1, further comprising:
    displaying a message on the gaming machine used by a player indicating an amount of playing time on the gaming machine needed by the player to be eligible for the progressive jackpot.

14. The method of claim 1, further comprising:
    displaying a message on the gaming machine used by a player indicating an amount of coin-in on the gaming machine needed by the player to be eligible for the progressive jackpot.

15. The method of claim 1, wherein determining on a periodic basis whether at least one of the eligible players is a winner of the progressive jackpot comprises:
    determining a winner independently of generation of winning combination of elements on any gaming machine associated with the progressive jackpot.

16. The method of claim 1, wherein determining on a periodic basis whether at least one of the eligible players is a winner of the progressive jackpot comprises:
    selecting a stored, predetermined value from an electronic pull tab arrangement, the electronic pull tab arrangement comprising a plurality of predetermined stored values, including at least one winning value;
    determining whether the selected value is a winning value; and associating the selected value with one of the eligible players.

17. The method of claim 1, wherein determining on a periodic basis whether at least one of the eligible players is a winner of the progressive jackpot comprises:
   selecting a stored, predetermined value from an electronic pull tab arrangement, the electronic pull tab arrangement comprising a plurality of predetermined stored values, including at least one winning value;
   determining whether the selected value is a winning value; and
   associating the selected value with one of the gaming machines associated with the progressive jackpot.

18. An progressive jackpot system for managing a progressive jackpot associated with a plurality of gaming machines, the system comprising:
   a progressive jackpot database computer system, including a memory for storing computer software implemented rules associated with a progressive jackpot, and attributes of a progressive jackpot, the attributes including gaming machines associated with the progressive jackpot, and a time period during which the progressive jackpot operates, the rules including at least one rule defining a funding rate rule for adding funds to the progressive jackpot in response to variable factors, the variable factors comprising internal factors and external factors, wherein the internal factors describe operating conditions of the gaming machines, and the external factors describe factors independent of the gaming machines and players, the funds for the progressive jackpot obtained from an existing source of funds that is independent of the paytables of the gaming machines and not directly taken from coin-in to the gaming machines during the time period during which the progressive jackpot operates;
   a jackpot operation computer system, including a processor, a memory and coupled to the progressive jackpot database computer system, the jackpot operation system storing in its memory computer software, executable by the processor to receive via a network communication link data regarding player activity at the gaming machines associated with the progressive jackpot, to determine whether a player playing one of the gaming machines is eligible for the progressive jackpot, to fund the progressive jackpot from the existing source of funds without using a portion of the coin-in to the gaming machines during the progressive jackpot, to automatically and programmatically vary according to the at least one funding rate rule, the funding rate of funds added to the progressive jackpot during the time period the progressive jackpot operates, and to determine on a periodic basis whether an eligible player has won the progressive jackpot, wherein the periodic basis is variable in response to the internal factors describing operating conditions of the gaming machines and external factors describing factors independent of the gaming machines and players; and
   a player tracking database computer system, including a memory adapted to store historical data of player betting activity, the player tracking database computer system communicatively coupled to the jackpot operation computer system, wherein the jackpot operation computer system is configured to access the historical data for a player from the player tracking database computer system to determine whether the player is eligible for the progressive jackpot;
   wherein the internal factors comprise at least a plurality of the following:
     a current amount of the progressive jackpot;
     a current funding rate;
     a current number of card-in players;
     a rate of card-in by players;
     a current number of players at a selected player tier;
     a rate of card-in by players at a selected player tier;
     a current number of all players;
     a total amount of coin-in for all open gaming sessions; and
     a hold percentage of the gaming machines.

19. The progressive jackpot system of claim 18, further comprising:
   a plurality of jackpot operation servers, each server including a processor and memory and associated with a property and having computer software executable by its processor for managing at least one progressive jackpot at the property, wherein the progressive jackpots at the various properties are linked together.

20. The progressive jackpot system of claim 18, wherein each gaming machine is adapted to determine whether a player is a winner of a game play at the gaming machine, independently of the jackpot operation computer system determining whether a player has won the progressive jackpot associated with the gaming machine.

21. The progressive jackpot system of claim 18, wherein each gaming machine is coupled to a gaming server having a processor and a memory including computer software executable by the processor and adapted to determine whether a player at the gaming machine is a winner of game play at the gaming machine independently of the jackpot operation computer system determining whether a player has won the progressive jackpot associated with the gaming machine.

22. The progressive jackpot system of claim 18, wherein the computer software of the jackpot operation computer system is further adapted to vary the funding rate automatically and programmatically according to a funding rate rule responsive to the current time of day.

23. The progressive jackpot system of claim 18, wherein the computer software of the jackpot operation system is further adapted to vary the funding rate automatically and programmatically in response to a funding rate rule responsive to a current number of players at the gaming machines associated with the progressive jackpot.

24. A method of conducting a progressive jackpot, the method performed by a computer system, and comprising:
   storing in a computer system database historical data of player betting activity for a plurality of players;
   designating, with the computer system, a plurality of gaming machines as associated with a progressive jackpot, the progressive jackpot operating during a time period;
   funding the progressive jackpot using a funding rate from an existing source of funds, where the source of funds is independent of paytables of the gaming machines and is not directly taken from coin-in to the gaming machines during the time period the progressive jackpot operates;
   automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
     a current amount of the progressive jackpot;
     a current funding rate;

a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting activity, that one or more players at the gaming machines are eligible to win the progressive jackpot associated with the gaming machines; and
determining on a periodic basis whether at least one of the eligible players is a winner of the progressive jackpot, wherein the periodic basis varies in response to a current level of gaming activity at the gaming machines associated with the progressive jackpot.

25. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to a current number of players at the gaming machines associated with the progressive jackpot.

26. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to a current number of players at the gaming machines associated with the progressive jackpot who have inserted a player tracking card into card readers coupled to the gaming machines.

27. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and determining on a periodic basis whether at least one of the eligible players is a winner of the progressive jackpot, wherein the periodic basis varies in response to a current rate at which players insert player tracking cards into card readers coupled to the gaming machines associated with the progressive jackpot.

28. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to a current number of players at a selected tier in a player tracking club.

29. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to a current rate at which players from a selected tier in a player tracking club insert player tracking cards into card readers coupled to the gaming machines associated with the progressive jackpot.

30. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to a total amount of coin-in at the gaming machines associated with the progressive jackpot.

31. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;

automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;

determining, by the computer system using the historical data of player betting, that one or more players at the gaming machines are eligible to win the progressive jackpot associated with the gaming machines; and determining on a periodic basis whether at least one of the eligible players is a winner of the progressive jackpot, wherein the periodic basis varies in response to a current time period.

32. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to an occupancy of a hotel.

33. A method of conducting a progressive jackpot, the method performed by a computer system, and comprising:
storing in a computer system database historical data of player betting activity for a plurality of players;
designating, with the computer system, a plurality of gaming machines as associated with a progressive jackpot, the progressive jackpot operating during a time period;
funding the progressive jackpot using a funding rate from an existing source of funds, where the source of funds is independent of paytables of the gaming machines and is not directly taken from coin-in to the gaming machines during the time period the progressive jackpot operates;
automatically and programmatically varying, by the computer system, the funding rate during the time period the progressive jackpot operates using funding rate rules based upon internal factors describing operating conditions of the gaming machines and external factors describing factors independent of the gaming machines and players, wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;
determining, by the computer system using the historical data of player betting, that one or more players at the gaming machines are eligible to win the progressive jackpot associated with the gaming machines; and
determining on a periodic basis whether at least one of the eligible players is a winner of the progressive jackpot, wherein the periodic basis varies in response to a special event occurring at a casino containing the gaming machines associated with the progressive jackpot.

34. A method of conducting a progressive jackpot, the method performed by a computer system, and comprising:
storing in a computer system database historical data of player betting activity for a plurality of players in a player tracking club, each of the players associated with one of a plurality of tiers of the player tracking club;
designating, with the computer system, a plurality of gaming machines as associated with a first progressive jackpot for players in a selected first tier in the player tracking club, and as further associated with a second progressive jackpot for players in a selected second tier in the player tracking club;
funding the first progressive jackpot using a first funding rate from an existing source of funds, where the source of funds is independent of paytables of the gaming machines and is not directly taken from coin-in to the gaming machines during the time period the progressive jackpot operates, including funding the first progressive jackpot using a first funding rate that varies during the first progressive jackpot;
funding the second progressive jackpot using a second funding rate from an existing source of funds, where the source of funds is independent of paytables of the gaming machines and is not directly taken from coin-in to the gaming machines during the time period the progressive jackpot operates, including funding the second progressive jackpot using a second funding rate that varies during the second progressive jackpot, wherein the computer system automatically and programmatically varies at least one of the first funding rate and the second funding rate according to a least one of a plurality of funding rate rules based upon factors comprising internal factors and external factors, wherein the internal factors describe operating conditions of the gaming machines, and the external factors describe factors independent of the gaming machines and players, and wherein the internal factors comprise at least a plurality of the following:
  a current amount of the progressive jackpot;
  a current funding rate;
  a current number of card-in players;
  a rate of card-in by players;
  a current number of players at a selected player tier;
  a rate of card-in by players at a selected player tier;
  a current number of all players;
  a total amount of coin-in for all open gaming sessions; and
  a hold percentage of the gaming machines;
determining on a periodic basis, by the computer system using the historical data of player betting activity, that one or more players at the first plurality of gaming machines are eligible to win the first progressive jackpot by identifying players in the first tier in the player tracking club, and selecting at least one of the designated individuals as a winner of the first progressive jackpot, wherein the periodic basis is variable in response to the internal factors describing operating conditions of the first plurality of gaming machines and external factors describing factors independent of the first plurality of gaming machines and players in the first tier of the player tracking club; and
determining on a periodic basis, by the computer system using the historical data of player betting activity, that one or more players at the second plurality of gaming machines are eligible to win the second progressive jackpot by identifying players in the second tier in the player tracking club, and selecting at least one of the designated individuals as a winner of the second progressive jackpot, wherein the periodic basis is variable in response to the internal factors describing operating conditions of the second plurality of gaming machines and external factors describing factors independent of the second plurality of gaming machines and players in the second tier of the player tracking club;
wherein the internal factors comprise at least a plurality of the following:
  a current amount of the progressive jackpot;
  a current funding rate;
  a current number of card-in players;
  a rate of card-in by players;
  a current number of players at a selected player tier;
  a rate of card-in by players at a selected player tier;
  a current number of all players;
  a total amount of coin-in for all open gaming sessions; and
  a hold percentage of the gaming machines; and
wherein the external factors comprise at least a plurality of the following:
  a current time of day;
  a current day of week;
  a current season;
  an occupancy of hotel rooms at a hotel associated with the gaming machines;
  a holiday; and
  a promotional event occurring at the casino having the gaming machines.

35. A method of conducting a progressive jackpot, the method performed by a computer system, and comprising:
  designating, with the computer system, a plurality of gaming machines as associated with a progressive jackpot, the progressive jackpot operating during a time period;
  funding the progressive jackpot using a funding rate from an existing source of funds, where the source of funds is independent of paytables of the gaming machines and is not directly taken from coin-in to the gaming machines during the time period the progressive jackpot operates;
  automatically and programmatically varying, by the computer system, the funding rate during the time period the progressive jackpot operates, wherein automatically and programmatically varying the funding rate comprises:
    executing at least one of a plurality of funding rate rules, each funding rate rule associated with the progressive jackpot and defining a funding rate for funding the progressive jackpot in response to at least one variable factor;
  determining, by the computer system, that one or more players at the gaming machines are eligible to win the progressive jackpot associated with the gaming machines; and
  determining, by the computer system, on a periodic basis whether at least one of the eligible players is a winner of the progressive jackpot, wherein the periodic basis is variable in response to the internal factors describing operating conditions of the gaming machines and external factors describing factors independent of the gaming machines and players,
  wherein the variable factors comprises:
    internal factors describing operating conditions of the gaming machines; and
    external factors describing factors independent of the gaming machines and players; and
  wherein the internal factors comprise at least a plurality of the following:
    a current amount of the progressive jackpot;
    a current funding rate;
    a current number of card-in players;
    a rate of card-in by players;
    a current number of players at a selected player tier;
    a rate of card-in by players at a selected player tier;
    a current number of all players;
    a total amount of coin-in for all open gaming sessions; and
    a hold percentage of the gaming machines.

36. The method of claim 35, wherein the external factors comprise at least a plurality of the following:
  a current time of day;
  a current day of week;
  a current season;
  an occupancy of hotel rooms at a hotel associated with the gaming machines;
  a holiday; and
  a promotional event occurring at the casino having the gaming machines.

37. A method of conducting a progressive jackpot, the method performed by a computer system, and comprising:
  storing in a computer system database historical data of player betting activity for a plurality of players;
  for each of the plurality of progressive jackpots, designating a group of gaming machines as associated with the progressive jackpot, each progressive jackpot operating over a time period;

establishing for each progressive jackpot a funding rate for funding the progressive jackpot from an existing source of funds, where the source of funds for the progressive jackpot is independent of paytables of the gaming machines and is not directly taken from coin-in to the gaming machines associated with the progressive jackpot during the time period the progressive jackpot operates;

automatically and programmatically varying, by the computer system, the funding rate during the time period of each progressive jackpot operates by executing at least one of a plurality of funding rate rules, each funding rate rule associated with the progressive jackpot and defining a funding rate for funding the progressive jackpot in response to factors comprising internal factors and external factors, wherein the internal factors describe operating conditions of the gaming machines, and the external factors describe factors independent of the gaming machines and players;

establishing for each progressive jackpot a set of eligibility criteria for determining whether individual players at the gaming machines associated with the progressive jackpot are eligible to win the progressive jackpot;

determining, by the computer system using the historical data of player betting activity, that one or more players at the gaming machines are eligible to win the progressive jackpot associated with the gaming machines; and for each progressive jackpot, determining on a periodic basis whether at least one of the eligible players at the gaming machines associated with the progressive jackpot is a winner of the progressive jackpot, wherein the periodic basis is variable in response to the internal factors describing operating conditions of the gaming machines and external factors describing factors independent of the gaming machines and players;

wherein the internal factors comprise at least a plurality of the following:
a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines.

38. A method of conducting a progressive jackpot, the method performed by a computer system, and comprising:

storing in a computer system database historical data of player betting activity for a plurality of players;

for each of the plurality of progressive jackpots, designating a group of gaming machines as associated with the progressive jackpot, each progressive jackpot operating over a time period;

establishing for each progressive jackpot a funding rate for funding the progressive jackpot from an existing source of funds, where the source of funds for the progressive jackpot is independent of paytables of the gaming machines and is not directly taken from coin-in to the gaming machines associated with the progressive jackpot during the time period the progressive jackpot operates;

automatically and programmatically varying, by the computer system, the funding rate during the time period of each progressive jackpot operates by executing at least one of a plurality of funding rate rules, each funding rate rule associated with the progressive jackpot and defining a funding rate for funding the progressive jackpot in response to factors comprising internal factors and external factors, wherein the internal factors describe operating conditions of the gaming machines, and the external factors describe factors independent of the gaming machines and players;

establishing for each progressive jackpot a set of eligibility criteria for determining whether individual players at the gaming machines associated with the progressive jackpot are eligible to win the progressive jackpot;

determining, by the computer system using the historical data of player betting activity, that one or more players at the gaming machines are eligible to win the progressive jackpot associated with the gaming machines; and for each progressive jackpot, determining on a periodic basis whether at least one of the eligible players at the gaming machines associated with the progressive jackpot is a winner of the progressive jackpot, wherein the periodic basis is variable in response to the internal factors describing operating conditions of the gaming machines and external factors describing factors independent of the gaming machines and players;

wherein the external factors comprise at least a plurality of the following:
a current time of day;
a current day of week;
a current season;
an occupancy of hotel rooms at a hotel associated with the gaming machines;
a holiday; and
a promotional event occurring at the casino having the gaming machines.

39. An progressive jackpot system for managing a progressive jackpot associated with a plurality of gaming machines, the system comprising:

a progressive jackpot database computer system, including a memory for storing computer software implemented rules associated with a progressive jackpot, and attributes of a progressive jackpot, the attributes including gaming machines associated with the progressive jackpot, and a time period during which the progressive jackpot operates, the rules including at least one rule defining a funding rate rule for adding funds to the progressive jackpot in response to variable factors, the variable factors comprising internal factors and external factors, wherein the internal factors describe operating conditions of the gaming machines, and the external factors describe factors independent of the gaming machines and players, the funds for the progressive jackpot obtained from an existing source of funds that is independent of the paytables of the gaming machines and not directly taken from coin-in to the gaming machines during the time period during which the progressive jackpot operates;

a jackpot operation computer system, including a processor, a memory and coupled to the progressive jackpot database computer system, the jackpot operation system storing in its memory computer software, executable by the processor to receive via a network communication link data regarding player activity at the gaming machines associated with the progressive jackpot, to determine whether a player playing one of the gaming machines is eligible for the progressive jackpot, to fund the progressive jackpot from the existing source of funds without using a portion of the coin-in to the gaming machines during the progressive jackpot, to automatically and programmatically vary according to the at least one funding rate rule, the funding rate of funds added to the progressive jackpot during the time period the progressive jackpot operates, and to determine on a periodic basis whether an eligible player has won the progressive jackpot, wherein the periodic basis is variable in response to the internal factors describing operating conditions of the gaming machines and external factors describing factors independent of the gaming machines and players; and a player tracking database computer system, including a memory adapted to store historical data of player betting activity, the player tracking database computer system communicatively coupled to the jackpot operation computer system, wherein the jackpot operation computer system is configured to access the historical data for a player from the player tracking database computer system to determine whether the player is eligible for the progressive jackpot;

wherein the external factors comprise at least a plurality of the following:
a current time of day;
a current day of week;
a current season;
an occupancy of hotel rooms at a hotel associated with the gaming machines;
a holiday; and
a promotional event occurring at the casino having the gaming machines.

40. A method of conducting a progressive jackpot, the method comprising:

designating a plurality of gaming machines as associated with a progressive jackpot;

applying a progressive jackpot template to establish the progressive jackpot, the template including a plurality of attributes for the progressive jackpot, the plurality of attributes including modifiable attributes and non-modifiable attributes, the non-modifiable attributes including a source of funds and at least one funding rate rule defining a funding rate for funding the progressive jackpot in response to that one or more variable factors, wherein the factors include internal factors describing operating conditions of the gaming machines; and external factors describing factors independent of the gaming machines and players, wherein the internal factors comprise at least a plurality of the following: a current amount of the progressive jackpot;
a current funding rate;
a current number of card-in players;
a rate of card-in by players;
a current number of players at a selected player tier;
a rate of card-in by players at a selected player tier;
a current number of all players;
a total amount of coin-in for all open gaming sessions; and
a hold percentage of the gaming machines;

the modifiable attributes including eligibility attributes of players for the progressive jackpot, a time period during which the progressive jackpot operates, and conditions for awarding the progressive jackpot, wherein the source of funds is an existing source of funds that is independent of paytables of the designated gaming machines, and that is not directly taken from coin-in to the designated gaming machines while the progressive jackpot is operating, wherein the at least one funding rate rule includes factors for varying the funding rate during the time period the progressive jackpot operates;

funding the progressive jackpot using the funding rate from the source of funds;

designating individual players at the gaming machines as eligible to win the progressive jackpot in accordance with the attributes defining eligibility of players; and determining whether at least one of the eligible players is a winner of the progressive jackpot in accordance with the attributes defining conditions for awarding the progressive jackpot.

41. The method of claim 40, wherein the external factors comprise at least a plurality of the following:
a current time of day;
a current day of week;
a current season;
an occupancy of hotel rooms at a hotel associated with the gaming machines;
a holiday; and
a promotional event occurring at the casino having the gaming machines.

* * * * *